July 12, 1949.　　　　T. A. RICH　　　　2,475,640
ELECTRIC QUANTITY STANDARD
Filed March 21, 1946
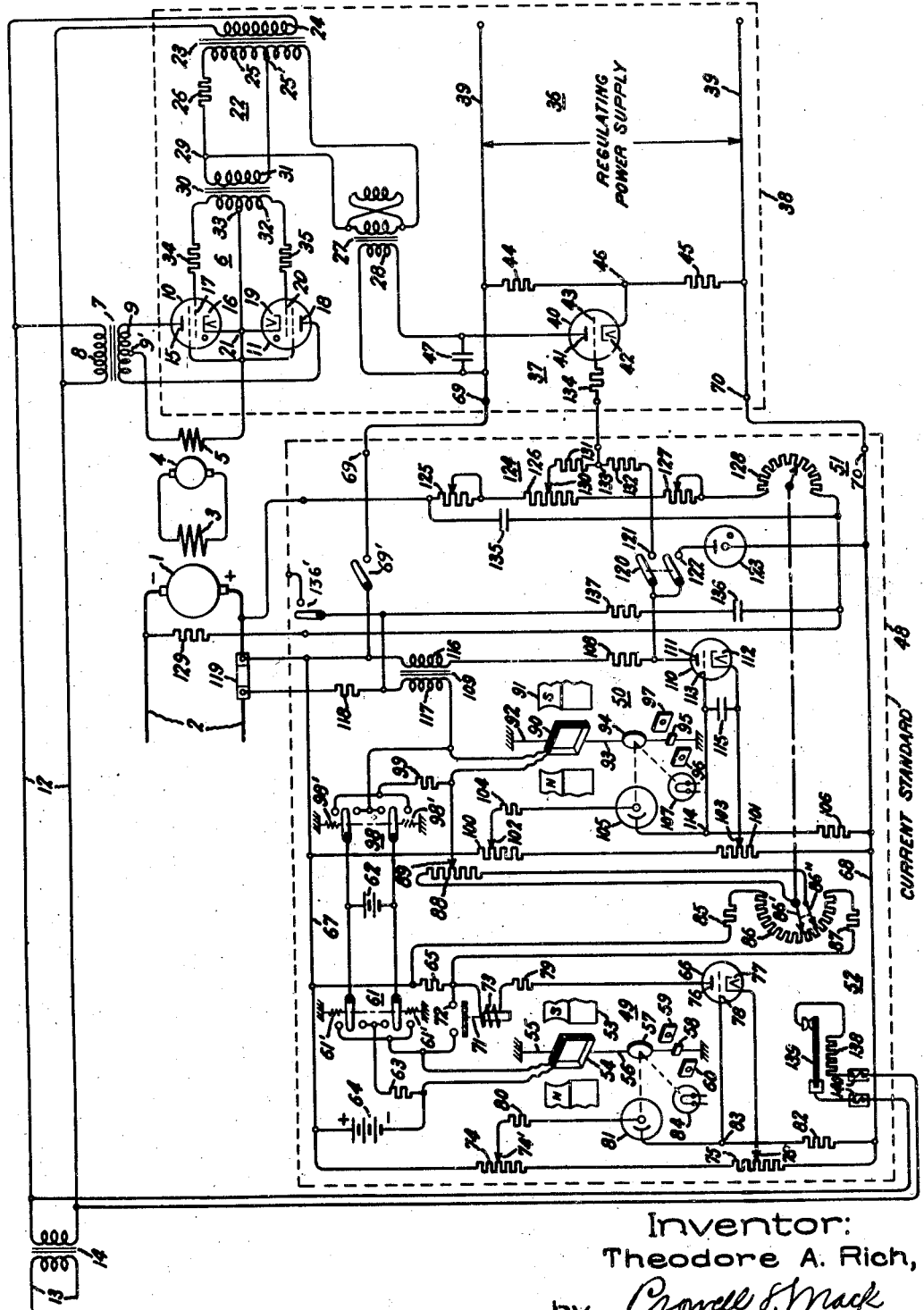
Inventor:
Theodore A. Rich,
by Prowell & Mack
His Attorney.

Patented July 12, 1949

2,475,640

UNITED STATES PATENT OFFICE 2,475,640

ELECTRIC QUANTITY STANDARD

Theodore A. Rich, Schenectady, N. Y., assignor to General Electric Company, a corporation of New York Application March 21, 1946, Serial No. 655,982

11 Claims. (Cl. 323—23)

My invention relates to an electric quantity standard and more particularly to an electric network for providing a secondary standard of an electric quantity having the characteristics of a standard cell.

It is an object of my invention to provide a new and improved standard of an electric quantity.

It is another object of my invention to provide a new and improved electric network for providing a secondary standard of voltage from which different components of voltage may be obtained having the same characteristics as the voltage of a primary standard such as a standard cell.

It is a further object of my invention to provide a new and improved electric network suitable for use as a current standard.

In accordance with the illustrated embodiment of my invention, I provide an electronic network which utilizes a constant source of voltage such as a standard cell as the primary reference voltage in combination with a compensated galvanometer and an associated electronic control circuit to provide a secondary voltage standard having the characteristics of the constant source of voltage. The secondary voltage standard is, in turn, associated with a second compensated galvanometer and its associated electronic circuit to compare the secondary standard with an electric quantity, such as the voltage or current, of a circuit or device subject to variations in its electrical condition.

My invention will be better understood from the following description taken in connection with the accompanying drawing, and its scope will be pointed out in the appended claims.

The single figure of the accompanying drawing is a diagrammatic illustration of one embodiment of my invention as utilized in controlling a direct current generator.

Referring to the drawing, I have shown an embodiment of my invention utilized as a current standard in connection with the control of a direct current dynamo-electric machine which is shown in a simplified form for the purpose of illustrating how my current standard may be applied. The details of such a dynamo-electric machine control system are described and claimed in Patent No. 2,452,611, granted November 2, 1948, upon a copending application Serial No. 655,981 of Jerry L. Stratton filed concurrently herewith and assigned to the assignee of the present application. I have shown a generator 1 provided with an armature output circuit 2 and a field winding 3 which, in turn, is connected to be energized by an exciter 4 having a separately energized field winding 5. The exciter field winding 5 is connected to be energized from a controlled rectifier 6 which comprises a transformer 7 having a primary winding 8 and a secondary winding 9 connected through a pair of electronic tubes 10 and 11 which are arranged for bi-phase half-wave rectification. The primary winding 8 of the rectifier transformer 7 is connected to be energized from an alternating current supply bus 12 which, in turn, is connected to be energized from a main alternating current supply circuit 13, preferably through a constant voltage transformer 14, to insure a substantially constant voltage for energizing the various component circuits of the regulator. Electronic tubes 10 and 11 are preferably of the gaseous type, such as of the thyratron type as illustrated, and each tube is provided with a control electrode to control the desired current for energization of the exciter field winding 5. Tube 10 is provided with an anode 15, a cathode 16 and a control grid 17, while tube 11 is similarly provided with an anode 18, a cathode 19 and a control grid 20. One terminal of field winding 5 is connected to a midpoint 9' of the secondary winding 9 and the other terminal of field winding 5 is connected to a junction point 21 of the cathodes 16 and 19 in a conventional manner for bi-phase rectification. The heater circuits for cathodes 16 and 19 have been omitted to avoid complicating the drawing, but such heater circuits would be provided for these tubes as well as for the other tubes later described in any conventional manner well known in the art. The control grids 17 and 20 are connected to be controlled through a suitable phase shifting means or network 22 which, as illustrated, comprises a transformer 23 having a primary winding 24, connected to be energized from the alternating current supply bus 12, and a secondary winding 25 provided with an electrical midpoint terminal 25'. A resistor 26 and a saturable reactor 27 provided with a direct current saturating winding 28 are connected in series relation across the end terminals of the secondary winding 25. A junction terminal 29 is provided between the resistor 26 and the saturable reactor 27. A grid transformer 30 is provided to supply a voltage from the phase shift circuit 22 which is variable in phase with respect to the voltage impressed upon the anode-cathode circuits of tubes 10 and 11. Grid transformer 30 comprises a primary winding 31 connected between the electrical midpoint 25' and the junction terminal 29, and a secondary winding 32 having a midpoint terminal 33 connected to the cathode junction terminal 21 with the end terminals thereof connected through grid resistors 34 and 35 to grids 17 and 20, respectively.

The regulator which controls the energization of generator 1 by controlling the rectifier 6 comprises a voltage standard section 36 and a voltage amplifier section 37. These two sections along with the rectifier 6 and its phase shift circuit 22 may be conveniently mounted on the same panel for unit enclosure as indicated by the dotted rectangle 38. Power supply for the voltage standard 36 may be obtained from a conventional power regulated supply unit which is connected to energize the conductors 39. The control of the rectifier 6 is effected by means of the phase shift circuit 22 by varying the saturation of reactor 27 by means of its direct current winding 28. The energization of winding 28 is obtained by connecting this winding across the voltage standard conductors 39 through a controlled electronic tube 40. The tube 40 is illustrated as being of the high vacuum type with an anode 41, a cathode 42 and a control grid 43. A voltage divider comprising resistors 44 and 45 is connected to be energized in accordance with the voltage of conductors 39. A junction terminal 46 is provided between the resistors 44 and 45 and is connected to the cathode 42 of tube 40 to maintain the cathode of tube 40 at some predetermined voltage negative with respect to the positive bus of conductors 39. A by-pass capacitor 47 is connected across the saturating coil 28.

In accordance with my invention, I provide a "current standard" which comprises an electronic control network preferably encased in a constant temperature box or compartment indicated by the dotted rectangle 48. The current standard may be divided into four circuits which may be identified as a "reference fluxmeter" 49, a "monitor fluxmeter" 50, a "feed-back circuit" 51 and a compartment heater circuit 52. The reference fluxmeter 49 comprises, broadly speaking, a compensated galvanometer of the type described and claimed in Patent No. 2,356,608, granted August 22, 1944 upon an application of Lorin O'Bryan. The term "compensated" as used in connection with this galvanometer means that the meter does not tend to drift either to a zero or to a stop position at either end of its travel. Since the specific details of the fluxmeter per se form no part of my invention, I have illustrated the essential elements of the device in a simplified diagrammatic form as comprising a magnetic core 53 within which is suspended a coil winding 54 by means of wires 55 and 56, preferably of gold alloy. A mirror 57 is mounted on the wire 56. The fluxmeter is similar to a direct current milliammeter except that it has no restraining torque and very little friction in view of the gold wire suspension. Whatever restraining torque is introduced by the gold wire suspension is canceled out by a tiny permanent magnet 58 operating in the stray field of the magnet 53. Adjustment of the stray field is obtained by soft iron magnetic field shunting elements 59 and 60 which are adjustable towards or away from the magnet 58. The closer these two soft iron pieces are to the small torque-compensating magnet 58, the less the restraining torque is canceled out, and vice versa. By proper proportioning of these parts it is possible to substantially cancel the restraining torque and thus produce an instrument of extreme sensitivity. Manual control of the fluxmeter position is obtained by means of a reversing switch 61 which connects the coil 54 for energization of either polarity from a battery 62 through a resistor 63. The switch 61 is biased to a neutral contact position by suitable spring means 61'. The primary standard in the current standard is a constant and substantially non-variable source of voltage such as a standard cell 64, the voltage of which is compared with the voltage drop across a resistor 65. The resistor 65 and a control tube 66 are connected across bus conductors 67 and 68 which are energized from the regulated voltage supply input conductors 39 through terminals 69 and 70. A manual control switch 69' may be inserted in the positive conductor from terminal 69. In order to protect the standard cell, a relay 71 is provided and comprises contacts 72 and an operating coil 73 connected in series with resistor 65. The contacts 72 connect the standard cell 64 in differential relation with the voltage drop of resistor 65 across the coil 54. A voltage divider comprising resistors 74 and 75 is connected in series relation across the regulated voltage supply conductors 67 and 68. Resistors 74 and 75 are provided with adjustable taps 74' and 75', respectively. The tube 66 is provided with an anode 76, a cathode 77 and a control electrode 78. An anode resistor 79 is connected in series with anode 76 and the cathode 77 is connected to the adjustable tap 75'. A voltage divider comprising in series relation a resistor 80, a light sensitive device such as phototube 81 and a resistor 82 is connected between the adjustable tap 74' and to conductor 68. The grid 78 of tube 66 is connected to a junction terminal 83 between the phototube 81 and the resistor 82. The resistance of the phototube is controlled in accordance with the amount of light striking its target as directed thereon by mirror 57 of the fluxmeter from a source of light 84, and thereby controls the conductivity of tube 66 by controlling the potential of grid 78.

It may be helpful at this point to consider the operation of the reference fluxmeter 49. By placing the reversing switch 61 in one position or the other, a voltage is impressed on the fluxmeter coil 54 from battery 62 to force coil 54 to rotate in one direction or the other to a given position. The phototube 81 and resistors 80 and 82 form a voltage divider circuit to control the grid 78 of the tube 66. As soon as tube 66 is rendered conductive by the initial positioning of coil 54, relay 71 picks up to close its contacts 72 and thereby connect coil 54 of the fluxmeter for energization in accordance with the differential voltage of the standard cell 64 and the drop across resistor 65. Since the fluxmeter will rotate in one direction as long as voltage of one polarity is impressed across it and in the opposite direction if the voltage is reversed, the fluxmeter will hold the anode current of tube 66 at a value which will produce a voltage across resistor 65 exactly equal to the voltage of standard cell 64. If the anode current of tube 66 starts to drop, the higher voltage of the standard cell will cause the fluxmeter to swing the light beam further on the phototube 81 to increase in a positive direction the potential of grid 78 and thereby increase the current through resistor 65 and establish a state of voltage equilibrium with the voltage of the standard cell. If for any reason, such as failure of the light source 84, the anode current to tube 66 drops below the predetermined value required to give the desired drop across resistor 65, the relay 71 will drop out and open the circuit of standard cell 64. After reestablishing the light source, the light beam will have to be projected on the phototube 81 by means of manual control switch 61 which may be momentarily operated to an energizing position to actuate the relay 71 to close contacts 72 and establish the desired grid potential on grid 78.

It will have been observed from the foregoing description of the reference fluxmeter 49 that coil 54 thereof effects regulation continuously and substantially coincidently with any change of position and that a standard voltage equal to the voltage of the standard cell 64 will be obtained across resistor 65. The standard voltage obtained across resistor 65 will be as standard as that of the standard cell, making it possible to tap off different voltage components having the characteristics of the voltage of the standard cell without drawing any current from the standard cell. A standard cell cannot be used as a standard if any appreciable current drain exists, and will not recover its standard voltage after this drain has been removed. With the arrangement described herein, the drain on the standard cell is so low that the properties of the standard cell are not adversely affected. This is possible because the compensated galvanometer is so sensitive that it will balance the voltages and the drain is in the thousandths of microamperes. This standard voltage drop across resistor 65 is divided into steps by the arrangement of resistors 85, 86, 87 and 88. Resistors 85 and 87, which may be fixed resistors, are connected in series relation with resistor 86 of the variable type across the voltage standard resistor 65. The resistor 86 is provided with two adjustable arms 86' and 86" which are adjusted in spaced relation on the resistor 86 and connected respectively to the terminals of resistor 88. If desired, the arms 86' and 86" may be tied together mechanically to preserve a given spaced relation between the arms and for operation thereof in unison. The resistor 88 is also provided with an adjustable arm 89.

The monitor fluxmeter 50 may be substantially the same as the reference fluxmeter 49 except that it may be provided with a lower resistance coil 90 cooperating with its magnetic core 91. The coil 90 is suspended by gold alloy wires 92 and 93 and a mirror 94 is mounted on the wire 93. The adjustment for the stray field is obtained by the small magnet 95 and the soft iron pieces 96 and 97 placed in the stray field of the magnet 91. Manual control of the fluxmeter 50 is obtained by means of a reversing switch 98 biased to a neutral contact position by suitable means indicated by the springs 98'. The switch 98 controls the monitor fluxmeter coil 90 through a resistor 99 from battery 62 in the same manner as switch 61 controls the reference fluxmeter coil 54. A voltage divider comprising resistors 100 and 101 connected in series relation across conductors 67 and 68 of the regulated voltage supply is provided for the controlled circuit of the monitor fluxmeter 50. The resistors 100 and 101 are provided respectively with adjustable arms 102 and 103. A voltage divider comprising a resistor 104, a light sensitive device such as a phototube 105 and a resistor 106 is connected in series relation between the adjustable arm 102 of resistor 100 and the bus conductor 68. The resistance of the phototube 105 is controlled in accordance with the amount of light striking its target as directed thereon by the mirror 94 from a light source 107. A control circuit for the monitor fluxmeter comprises a resistor 108 connected in series relation with transformer 109 (constituting a mutual inductance) and a controlled electronic tube 110 between the regulated bus conductor 67 and the adjustable arm 103 on resistor 101. The tube 110 is provided with an anode 111, a cathode 112 and a control grid 113. The grid 113 is connected to a junction terminal 114 between the phototube 105 and the resistor 106. A capacitor 115 is connected between the grid 113 and its cathode 112 for preventing the grid from changing its potential too quickly. The mutual inductance of transformer 109 comprises a primary winding 116 connected in series with the anode-cathode circuit of tube 110 and a secondary winding 117. The secondary winding 117 is connected in series relation with the coil 90 of the monitor fluxmeter through a resistor 118 to the negative terminal of a current shunt 119 connected in the positive output conductor 2 of generator 1. The positive terminal of shunt 119 is connected to the positive bus conductor 67 and hence also to the control circuit including primary winding 116 of the mutual inductance and the controlled tube 110. The monitor fluxmeter thus compares the component of voltage across shunt 119 with the voltage component derived from the secondary standard constituted by the voltage divider resistor 88 and the associated resistors 85, 86 and 87. This comparison circuit may be traced from the positive terminal of shunt 119, conductor 67, resistors 85, 86 and 88 and adjustable arm 89, through coil 90, thence through secondary winding 117 to the negative terminal of shunt 119. The mutual inductance 109 having its primary winding 116 in series relation with tube 110 slows down any change in energization of the coil 90 by inducing a voltage therein which tends to rotate the element 90 in such a direction as to oppose the change of current in the circuit of tube 110. A double-poled switch 120 having one set of contacts 121 and another set of contacts 122 is provided to connect a voltage regulating glow tube 123 through contact 122 to the anode of tube 110 and to the regulated bus conductor 68, and also to connect the glow tube 123 through contact 121 to the grid circuit of tube 40 by means of the feed-back circuit 51 now to be described.

The feed-back circuit 51 is utilized to insert a voltage component in the monitor fluxmeter in accordance with voltage changes of generator 1 and comprises a voltage divider 124 connected to, be responsive to the voltage of generator 1 and includes in series relation adjustable resistors 125, 126, 127 and 128 connected across the positive and negative terminals of generator 1 through a fixed resistor 129. The resistor 126 is provided with an adjustable arm 130 which is connected through series connected resistors 131 and 132 to the contacts 121 of switch 120. A junction terminal 133 is provided between the resistors 131 and 132 and is connected to the grid 43 of tube 40 through a grid resistor 134. A capacitor 135 is connected across the voltage divider 124 and with resistor 129 forms a filter circuit to reduce the voltage ripple on the voltage divider 124. A capacitor 136 is charged through a resistor 137 from the negative generator terminal in a circuit including resistor 137 and the resistor 118 in the circuit of fluxmeter coil 90 to the positive side of generator 1 through resistor 129. The capacitor 136 is thus arranged to charge or discharge when the voltage of generator 1 changes through the resistor 118 and thereby insert a component of voltage in the circuit of coil 90 of the monitor fluxmeter to suppress hunting. A switch 136' may be provided, if desired, to discharge capacitor 136 if the current standard is to be removed from its compartment.

The heater circuit 52 is provided to maintain the temperature of the current standard compartment 46 at a constant value and, as illustrated, this heater circuit comprises a heater element 138 preferably positioned near the bottom of the compartment with thermostat 139 and suitable fuse elements 140, all connected in series relation to be energized from the alternating current supply circuit 12.

The operation of the current standard in the regulating system illustrated is substantially as follows: If the switch 120 is open the device as shown is a voltage regulator on generator 1. When 120 is closed, the value of this voltage held is modified in such a way as to maintain constant current. The current standard compares a component of voltage from the current shunt 119 and a component of voltage derived from the standard voltage obtained from resistor 88 and its associated voltage divider resistors. The difference voltage thus obtained is amplified to modify the generator voltage obtained from the voltage divider 124 when switch 120 is closed. When switch 120 is closed, the grid of the amplifier tube 40 assumes the average voltage of tap 130 on resistor 126 and the anode voltage of tube 110. This average voltage varies in accordance with the operation of the monitor fluxmeter 50. When the voltage component across the shunt 119 is greater than the standard reference voltage, the fluxmeter coil 90 rotates to throw more light on phototube 105. More light on phototube 105 increases the positive potential of grid 113 of tube 110 and causes this tube to conduct more current. The increase of current in the circuit of tube 110 tends to lower the average potential of grid 43 of the amplifier tube. As a result, the tube 40 conducts less current and the direct current of saturating coil 28 is decreased so as to reduce the output of the rectifier 6 and thereby decrease the excitation of generator 1 to establish an equilibrium condition between the voltage component of shunt 119 and the standard of reference as established across resistor 88.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A standard of reference of an electric quantity comprising a source of constant voltage, a compensated galvanometer including means for producing a magnetic field and a coil winding having a torsional suspension rotatably mounted within said magnetic field, an impedance connected in series relation with said source of constant voltage and said coil, means for energizing said impedance to produce a voltage thereacross, and means continuously and substantially coincidently responsive to the position of said coil for controlling said last mentioned means to maintain the voltage drop across said impedance equal and opposite to the voltage of said source of constant voltage.

2. A standard of reference of an electric quantity comprising a standard cell, a compensated galvanometer including means for producing a magnetic field and a coil winding having a torsional suspension rotatably mounted within said magnetic field, a resistor connected in series relation with said standard cell and said coil, an electronic tube connected to circulate a current through said resistor for producing a voltage drop thereacross equal and opposite to the voltage of said standard cell, and means continuously and substantially coincidently responsive to the position of said coil for controlling the conductivity of said electronic tube.

3. A standard of reference of an electric quantity comprising a standard cell, a compensated galvanometer comprising means for producing a magnetic field and a coil winding having a torsional suspension rotatably mounted within said magnetic field, a resistor connected in series relation with said standard cell and said coil, an electronic tube connected to said resistor for circulating a current therethrough to provide a voltage drop thereacross, said electronic tube having a control electrode, means including a phototube for continuously controlling the potential of said control electrode and thereby the conductivity of said electronic tube, a source of light, and means including a mirror mounted for rotation with said coil for varying the amount of light directed from said light source upon said phototube coincidently with the position of said coil so as to maintain the voltage drop across said resistor equal and opposite to the voltage of said standard cell.

4. A standard of reference of an electric quantity comprising a standard cell, a compensated galvanometer comprising means for producing a magnetic field and a coil winding having a torsional suspension rotatably mounted within said magnetic field, a resistor connected in a series circuit with said standard cell and said coil, switching means connected in said series circuit, an electronic tube having an anode-cathode circuit connected to circulate a current continuously through said resistor for producing a voltage drop thereacross equal and opposite to the voltage of a standard cell, light sensitive means controlled in response to the position of said coil for coincidently controlling the conductivity of said electronic tube, and means responsive to the current in the anode-cathode circuit of said electronic tube for controlling said switching means.

5. A standard of reference of an electric quantity comprising a standard cell, a first compensated galvanometer including means for producing a magnetic field and a coil winding having a torsional suspension rotatably mounted within said magnetic field, a first resistor connected in series relation with said standard cell and said coil, means responsive to the position of said coil for maintaining the voltage drop across said resistor equal and opposite to the voltage of said standard cell, means including a second resistor for deriving a component of voltage from said first resistor, a second compensated galvanometer including means for producing a magnetic field and a coil winding having a torsional suspension otatably mounted within said magnetic field, means having a variable component of voltage thereacross connected in series relation with said second resistor and the coil of said second galvanometer, means for controlling said variable component of voltage, and means responsive to the position of the coil of said second galvanometer for controlling said last mentioned means.

6. A standard of reference of an electric quantity comprising a standard cell, a first compensated galvanometer including means for producing a magnetic field and a coil winding having a torsional suspension rotatably mounted within said magnetic field, a first resistor connected in series relation with said standard cell and said coil, a first electronic tube connected to circulate current through said resistor for producing a voltage drop thereacross equal and opposite to the voltage of said standard cell, light sensitive means controlled in response to the position of said coil for controlling the conductivity of said electronic tube, means including a second resistor for deriving a component of voltage from said first resistor, a second compensated galvanometer including means for producing a magnetic field and a coil winding having a torsional suspension rotatably mounted within said magnetic field, means having a variable component of voltage thereacross connected in series relation with said second resistor and the coil of said second galvanometer, means for controlling said variable component of voltage, a second electronic tube for controlling said last mentioned means, and a second light sensitive means responsive to the position of the coil of said second galvanometer for controlling said second electronic tube.

7. A standard of reference of an electric quantity comprising a standard cell, a first compensated galvanometer including means for producing a magnetic field and a coil winding having a torsional suspension rotatably mounted within said magnetic field, a first resistor connected in series relation with said standard cell and said coil, a first electronic tube connected to circulate current through said resistor for producing a voltage drop thereacross equal and opposite to the voltage of said standard cell, light sensitive means controlled in response to the position of said coil for controlling the conductivity of said electronic tube, means including a second resistor for deriving a component of voltage from said first resistor, a second compensated galvanometer including means for producing a magnetic field and a coil winding having a torsional suspension rotatably mounted within said magnetic field, means having a variable component of voltage thereacross connected in series relation with said second resistor and the coil of said second galvanometer, means for controlling said variable component of voltage, a second electronic tube for controlling said last mentioned means, inductive means provided with one winding connected in series relation with said second electronic tube and a second winding in mutual inductive relation with said first winding connected in series relation with the coil of said second galvanometer, and a second light sensitive means responsive to the position of the coil of said second galvanometer for controlling said second electronic tube.

8. A standard of reference of an electric quantity comprising a source of constant voltage, a compensated galvanometer comprising means for producing a magnetic field and a coil winding having a torsional suspension rotatably mounted within said magnetic field, a second source of voltage subject to variation connected in a series circuit with said source of constant voltage and said coil, means including an electronic tube having an anode-cathode circuit for controlling said second source of variable voltage, inductive means provided with one winding connected in the anode-cathode circuit of said electronic tube and a second winding in mutual inductive relation with said first winding connected in series relation with said coil, and means responsive to the position of said coil for varying the conductivity of said electronic tube to maintain equilibrium between said second source of voltage and said source of constant voltage.

9. A standard of reference of an electric quantity comprising a source of constant voltage, a compensated galvanometer comprising means for producing a magnetic field and a coil winding having a torsional suspension rotatably mounted within said magnetic field, a second source of voltage subject to variation connected in a series circuit with said source of constant voltage and said coil, means including an electronic tube having an anode-cathode circuit for controlling said second source of variable voltage, inductive means provided with one winding connected in the anode-cathode circuit of said electronic tube and a second winding in mutual inductive relation with said first winding connected in series relation with said coil, means responsive to the position of said coil for varying the conductivity of said electronic tube to maintain equilibrium between said second source of voltage and said source of constant voltage, and means for delaying a change in the conductivity of said electronic tube upon a change in the position of said coil.

10. A standard of reference of an electric quantity comprising a standard cell, a first compensated galvanometer including means for producing a magnetic field and a coil winding having a torsional suspension rotatably mounted within said magnetic field, a first resistor connected in series relation with said standard cell and said coil, means responsive to the position of said coil for maintaining the voltage drop across said resistor equal and opposite to the voltage of said standard cell, means including a second resistor for deriving a component of voltage from said first resistor, a second compensated galvanometer including means for producing a magnetic field and a coil winding having a torsional suspension rotatably mounted within said magnetic field, selective switching means for energizing at will the coil of either galvanometer to cause operation of either coil to a desired position in its associated magnetic field, means having a variable component of voltage thereacross connected in series relation with said second resistor and the coil of said second galvanometer, means for controlling said variable component of voltage, and means responsive to the position of the coil of said second galvanometer for controlling said last mentioned means.

11. A standard of reference of an electric quantity comprising a standard cell, a first compensated galvanometer including means for producing a magnetic field and a coil winding having a torsional suspension rotatably mounted within said magnetic field, a first resistor connected in series relation with said standard cell and said coil, means responsive to the position of said coil for maintaining the voltage drop across said resistor equal and opposite to the voltage of said standard cell, a voltage divider comprising a second resistor having an adjustable contact arm for deriving a component of voltage from said first resistor, a second compensated galvanometer including means for producing a magnetic field and a coil winding having a torsional suspension rotatably mounted within said magnetic field, an electric circuit subject to variations in voltage and current, a current shunt connected in said electric circuit and connected in series relation with said second resistor and the coil of said second galvanometer, a second voltage divider including a resistor having an adjustable contact arm and connected to be responsive to the voltage of said electric circuit, means for simultaneously operating said contact arms, means for controlling the voltage of said electric circuit, and means responsive to the position of the coil of said second galvanometer for controlling said last mentioned means.

THEODORE A. RICH.

REFERENCES CITED

The following references are of record in the file of this patent:

UNITED STATES PATENTS

| Number | Name | Date |
| --- | --- | --- |
| 1,939,443 | Geiselman | Dec. 12, 1933 |
| 2,404,891 | Schmitt | July 30, 1946 |
| 2,424,146 | Caldwell et al. | July 15, 1947 |